June 8, 1965 J. R. SWITZER 3,187,506
AIR INDUCTION SYSTEM
Filed Aug. 19, 1963
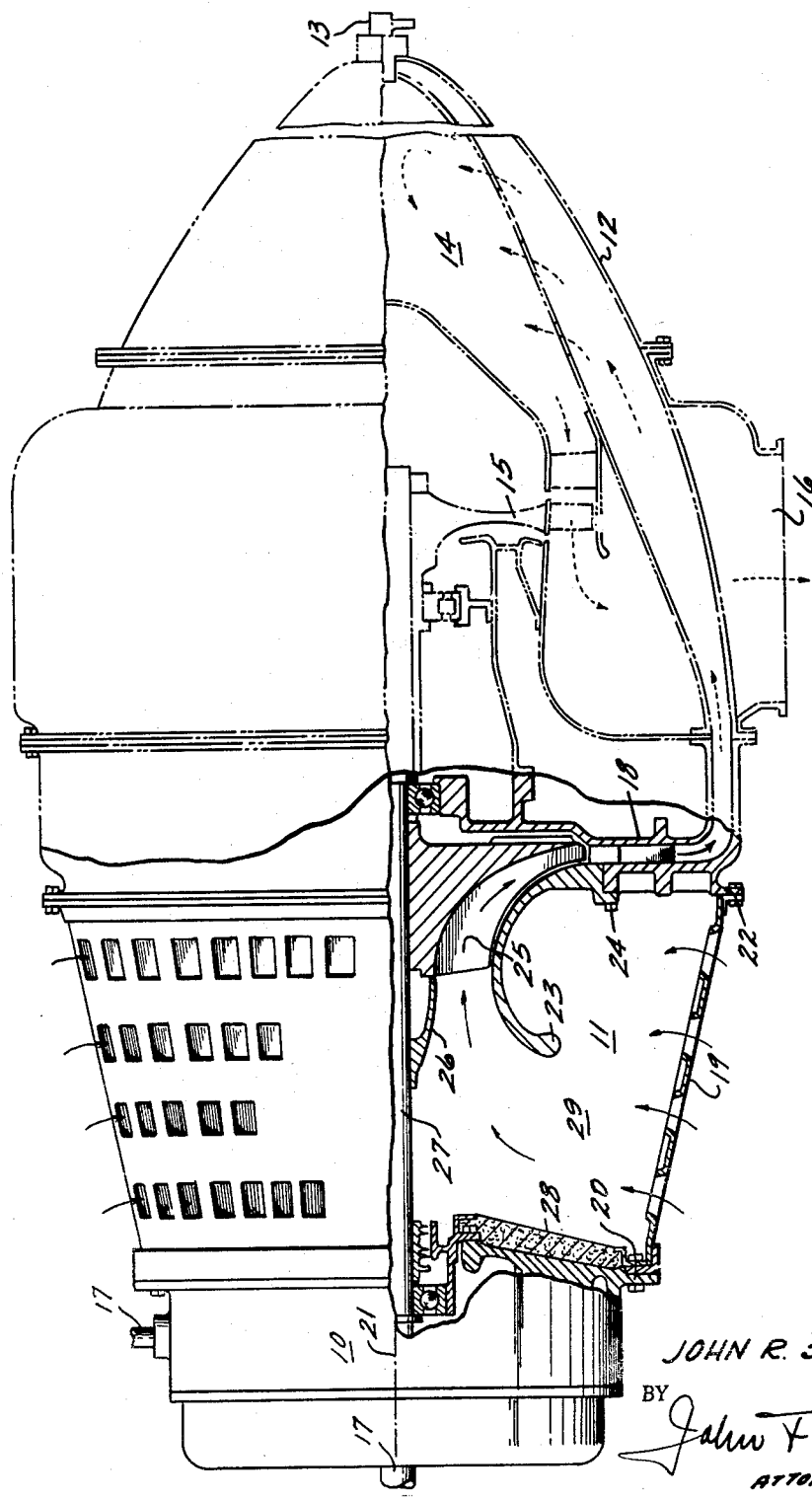
INVENTOR.
JOHN R. SWITZER
BY
John F. Cullen
ATTORNEY-

10

United States Patent Office 3,187,506
Patented June 8, 1965

3,187,506
AIR INDUCTION SYSTEM
John R. Switzer, Walnut Creek, Calif., assignor to General Electric Company, a corporation of New York
Filed Aug. 19, 1963, Ser. No. 303,010
6 Claims. (Cl. 60—39.31)

The present invention relates to an air induction system for a gas turbine engine and, more particularly, to such a system for a particular engine combination that eliminates obstructions to the air flow to provide an unobstructed air inlet to a centrifugal compressor.

The air induction systems of small turboshaft engines traditionally have been plagued with a difficult problem of directing the air flow to the compressor inlet with uniform velocity, minimum pressure loss, and minimum heat pickup from the adjacent hot engine parts. Generally, both circumferential and radial air flow variations must be contended with and these tend to produce a non-uniform velocity distribution as a result of pressure losses. In other words, in small turboshaft engines which generally use a centrifugal compressor or few stages of an axial compressor, it is very important that the compressor sees the incoming air from the same angle at the same velocity and not distorted. Variations in this constancy desired results in loss of efficiency in the impeller. Such losses may come about by the usual struts that create wakes or a separation region resulting in non-uniform flow. In addition, the struts provide a friction drag and pressure drag which shows up as pressure losses in the system and any loss in pressure means a loss in power normally available from the air flow through the engine. Furthermore, it is well known that if a given quantity of air is to be compressed to a prescribed pressure level the power that it takes to drive the compressor is directly proportional to the inlet temperature of the air. Thus, if the inlet temperature is higher it takes more power to drive the compressor. The additional power represents a loss in efficiency of the compression system which again is an overall loss of efficiency of the engine. Means have been used to cool the air and keep the temperature down to avoid this power increase necessary and such means have included water injection which reduces temperature and increases the mass flow.

The main object of the present invention is to provide an air induction system for a gas turbine engine of a given type which eliminates any struts or obstructions in the air inlet to the compressor.

Another object is to provide such a system wherein, through the elimination of the struts, all the load is taken by the inlet screen which is formed as a cone.

Another object is to provide such a system wherein the elimination of the struts permits use of a non-structural bellmouth inlet duct and a thermal insulation-sound absorption blanket on the air induction side of the gearbox.

Briefly stated, the invention is directed to an air induction system for a typical gas turbine engine that may occur in the lower power sizes. Such an engine has a gear box at one end and a combustor at the opposite end with a centrifugal compressor and a frame disposed between the two. The compressor induces air flow inwardly at its inner radius and exhausts it radially outwardly to pass rearwardly to the combustion system. This general arrangement is known. The invention provides a conical screen as the sole structural support between the frame and the gear box and is connected to both elements. A bellmouth duct and inlet spinner are provided for an unobstructed air inlet to the compressor which is possible by the use of the load carrying screen.

While the specification concludes with claims particularly pointing out and distinctly claiming the subject matter which I regard as my invention, it is believed the invention will be better understood from the following description taken in connection with the accompanying drawing in which:

The drawing shows an overall powerplant with the conventional structure in phantom and the invented unobstructed compressor inlet structure or air induction system shown in solid lines.

Referring to the drawing, a general engine arrangement is shown which is typical of a small turboshaft engine that is operable in the horizontal or vertical direction and includes gear box 10, compressor section 11 with an outlet to a reverse flow combustor 12 having an injector and/or igniter 13. Combustion gas in combustion area 14 passes forwardly through turbine 15 and out a suitable exhaust outlet 16 whence it is disposed overboard or used elsewhere. A suitable power take-off 17 may be provided in any suitable location or locations on gear box 10.

Generally, in a powerplant arrangement of the conventional type just described, it is very important to direct the air flow to the compressor in compressor section 11 and direct it to the compressor inlet with uniform velocity, minimum pressure loss, and minimum heat pickup from the adjacent hot engine parts at the gear box and compressor frame 18. Generally the structure in this compressor inlet area has included struts to tie the engine together from gear box 10 to compressor frame 18. This has necessitated heavy castings in the inlet structure. These castings, as well as being heavy, provide good heat conduction to the area of the air inlet to the compressor resulting in more power being necessary to drive the compressor.

The present invention overcomes this major defect by the use of screen 19 which serves a dual purpose. Screen 19 is connected to gear box 10 at one end through a flange 20 by bolts or their equivalent and flange 20 is transverse to the engine center line 21. The transverse flange connection ensures, as will be seen, that the load is thereby transmitted in an axial direction. Screen 19, in order to carry the rest of the engine load from the connection at flange 20, tapers outwardly to the largest engine diameter at the compressor frame 18 and is connected thereto at 22 with a similar flange connection. The screen 19 thus takes, in effect what is a strut structure, out to the maximum engine diameter at 22 in the form of a conical shell. It can be seen that the screen 19 is the exclusive load transmitting member between the gear box and the frame and thus serves two purposes. First, being a screen, it serves the purpose of a screen in screening the air of foreign particles to the compressor and second, the construction just described permits the screen to be used also as the main structural member replacing the ordinary struts across the compressor inlet but retaining the function of the struts.

In order to direct the air from this strutless inlet to the compressor non-structural parts may now be used. An air inlet duct 23 is provided and is secured by any suitable means to the compressor frame at 24 and this defines the outer boundary of the compressor inlet 25 which generally faces the gear box. The duct 23 may be a one-piece member and is generally bellmouth shaped as shown. The outer wall of the inlet is provided by a smaller diameter inlet spinner member 26 that is preferably secured to the engine shaft 27 and by a thermal insulation-sound absorption blanket 28 attached by any suitable means to the air induction side of the gearbox. These define an outwardly directed opening 29 from which it can be seen that the inlet annular bend from opening 29 to the compressor inlet 25 has a large area ratio with contraction delayed until axial entry to the compressor at 25. This entry is at a uniform velocity distribution because of the lack of structural hindrances to the airflow into the compressor. Furthermore, the outwardly directed opening 29 is large in proportion to the compressor inlet permitting a large contraction and thus large acceleration, so the losses in the low velocity, large area region, are not critical.

Additionally, the thermal insulation-sound absorption blanket 28 eliminates heat conduction from the hot gear box to the inlet airflow. With the arrangement of parts described the elimination of such heat conduction is desired, since, as pointed out above, the power required to drive the compressor is directly proportional to the air inlet temperature.

Further, by the structure described, the gear box wall is a reflecting surface for the siren noise transmitted from the compressor inlet to the surrounding atmosphere. The use of the insulating blanket in this surface reduces substantially the high frequency noise reflected to the atmosphere. Thus, the blanket performs the dual functions of sound reduction and heat absorption on a surface where, because of the overall arrangement, both occur.

The construction described permits use of the non-structural duct 23 since no load is imposed on it being transmitted through screen 19 instead. As a result, the non-structural part can be extremely light weight and a very good insulator. Thus, heat conduction from the hot portion of compressor frame 18 to the inlet 29 is not possible through inlet duct 23 because of its insulating qualities. Additionally, heat conduction from gear box 10 to the same area through thermal insulation-sound absorption blanket 28 is prevented because of the light weight, porous material that may be used with this construction. Because of the lack of heat conduction it is possible to run the compressor with smaller clearances between the duct 23 and inlet 25 since the parts do not expand due to large temperature differentials. Still further, the impeller at inlet 25 can rub non-structural duct 23 without damage to the impeller or duct 23.

Thus, it can be seen that the air induction system for the typical engine illustrated substitutes for the strut structure normally found, an inlet screen 19 to serves the purpose of screening and transmission of load and moves the load transmission mechanism radially outwardly to the largest part of the engine diameter for stability. This construction permits the use of light weight non-structural parts in a completely unobstructed air inlet and results in an overall improved light weight high efficiency small turboshaft engine.

While I have hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. An air induction system for a gas turbine engine having a gear box at one end and a combustor at the opposite end thereof,
   a centrifugal compressor mounted on the engine shaft and a frame disposed intermediate the gear box and combustor,
   said compressor having an annular air inlet facing said gear box,
   a conical screen connected to said frame and said gear box to transmit load therebetween,
   a compressor air inlet duct secured to said frame,
   a smaller diameter inlet spinner carried on the engine shaft within said air inlet duct,
   whereby said conical screen is the exclusive load transmitting member between said gear box and frame to provide an unobstructed air inlet to said compressor.

2. Apparatus as described in claim 1 wherein the conical screen is connected to said frame at the largest diameter of the engine.

3. Apparatus as described in claim 1 wherein the conical screen tapers inwardly to said gear box and is secured thereto through a flange transverse to the engine center line.

4. An air induction system for a gas turbine engine having a gear box at one end and a combustor at the opposite end thereof,
   a centrifugal compressor and frame disposed intermediate the gear box and combustor,
   said compressor having an annular air inlet facing said gear box,
   a conical screen radially outwardly of said compressor and connected to said frame and said gear box to transmit load therebetween,
   a first one-piece bellmouth shaped wall member secured to the frame at one end thereof to form one wall of a duct to the inlet of said compressor,
   a smaller diameter inlet spinner carried on the engine shaft within said air inlet duct and a blanket attached to said gear box facing said annular air inlet,
   said spinner and blanket forming the other wall of the compressor inlet to define with said first wall member an outwardly directed opening reducing to an axial inlet to said compressor,
   whereby said conical screen is the exclusive load transmitting member between said gear box and frame to provide an unobstructed air inlet to said compressor.

5. Apparatus as described in claim 4 wherein the conical screen is connected to said frame at the largest diameter of said engine.

6. Apparatus as described in claim 4 wherein the conical screen tapers inwardly to said gear box and is bolted thereto through a flange transverse to the engine center line.

References Cited by the Examiner

UNITED STATES PATENTS

| | | | |
|---|---|---|---|
| 2,432,359 | 12/47 | Streid | 60—39.31 |
| 2,507,018 | 5/50 | Jewett | 60—39.09 |
| 2,613,028 | 10/52 | Davis | 230—47 |
| 2,811,833 | 11/57 | Broffitt | 60—39.31 |
| 2,868,439 | 1/61 | Hampshire | 230—134 |
| 2,967,014 | 6/61 | Pabst | 230—134 |
| 3,016,003 | 1/62 | Jenn | 98—43 |
| 3,018,650 | 6/62 | Schmidt | 103—114 |

FOREIGN PATENTS 671,427  5/52  Great Britain.

SAMUEL LEVINE, *Primary Examiner.*